US008677009B2

(12) United States Patent
Gavrilov et al.

(10) Patent No.: US 8,677,009 B2
(45) Date of Patent: Mar. 18, 2014

(54) MASSIVE STRUCTURED DATA TRANSFER OPTIMIZATIONS FOR HIGH-LATENCY, LOW-RELIABILITY NETWORKS

(75) Inventors: Dmitri Gavrilov, Redmond, WA (US); Bradford R. Clark, Duvall, WA (US); James C. Kleewein, Kirkland, WA (US); Ayla Kol, Sammamish, WA (US); Brian T. Kress, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 12/692,305

(22) Filed: Jan. 22, 2010

(65) Prior Publication Data

US 2011/0185247 A1 Jul. 28, 2011

(51) Int. Cl.
*G06F 15/16* (2006.01)

(52) U.S. Cl.
USPC .......................................... 709/232

(58) Field of Classification Search
USPC .......................................... 709/232
See application file for complete search history.

(56) References Cited

U.S. PATENT DOCUMENTS

| | | | |
|---|---|---|---|
| 3,273,120 A * | 9/1966 | Dustin et al. ..................... 714/54 |
| 5,835,954 A | 11/1998 | Duyanovich et al. ........ 711/162 |
| 6,029,189 A * | 2/2000 | Ishida et al. .................. 718/105 |
| 6,128,715 A * | 10/2000 | Wang et al. .................... 711/168 |
| 6,202,085 B1 | 3/2001 | Benson et al. ................. 709/205 |
| 6,452,943 B1 * | 9/2002 | Furuya ........................... 370/468 |
| 6,654,830 B1 | 11/2003 | Taylor et al. |
| 6,687,255 B1 * | 2/2004 | Holm et al. ..................... 370/412 |
| 6,701,373 B1 * | 3/2004 | Sakazawa et al. ............. 709/232 |
| 6,862,151 B2 * | 3/2005 | Hoskins et al. ................. 360/53 |
| 7,016,967 B2 * | 3/2006 | Mori et al. ...................... 709/230 |
| 7,039,663 B1 | 5/2006 | Federwisch et al. ........... 707/205 |
| 7,133,984 B1 | 11/2006 | Dickensheets |
| 7,155,483 B1 | 12/2006 | Friend et al. .................... 709/206 |
| 7,197,665 B2 | 3/2007 | Goldstein et al. ................ 714/20 |
| 7,640,408 B1 | 12/2009 | Halligan et al. |
| 7,822,933 B1 | 10/2010 | Sontakke et al. |
| 8,301,868 B2 * | 10/2012 | Newburn et al. ............... 712/220 |
| 2003/0023933 A1 * | 1/2003 | Duncan .......................... 714/807 |
| 2005/0149582 A1 | 7/2005 | Wissmann et al. ............ 707/201 |
| 2006/0212671 A1 | 9/2006 | Todd |
| 2006/0236056 A1 | 10/2006 | Nagata |
| 2007/0245090 A1 | 10/2007 | King et al. ...................... 711/129 |
| 2009/0106515 A1 | 4/2009 | Arai et al. |

(Continued)

FOREIGN PATENT DOCUMENTS

WO    WO 2008/073493 A2 *   6/2008    .............. G06F 12/08

OTHER PUBLICATIONS

Qianqian Ge, Memory Management Strategies on TCP/IP performance for embedded Application, 2008, pp. 770-774.*

(Continued)

*Primary Examiner* — John Macilwinen
(74) *Attorney, Agent, or Firm* — Louise Bowman; Jim Ross; Micky Minhas (57) ABSTRACT

Optimizations for data transmission may be provided. A portion of a data block may be read into a batch by a read thread on a first server. The batch may be passed to a transmission thread. The transmission thread may then transmit the first batch to a second server while the read thread asynchronously reads a second portion of the data block into another batch.

20 Claims, 3 Drawing Sheets

(56) References Cited

U.S. PATENT DOCUMENTS

| | | | | |
|---|---|---|---|---|
| 2009/0193443 | A1 | 7/2009 | Lakshmanan et al. | 719/330 |
| 2009/0234911 | A1 | 9/2009 | Khavari | 709/203 |
| 2010/0202294 | A1* | 8/2010 | Mullendore et al. | 370/235 |
| 2011/0066819 | A1 | 3/2011 | Mashtizadeh et al. | |
| 2011/0185136 | A1 | 7/2011 | Gavrilov et al. | |

OTHER PUBLICATIONS

Deshmukh, End to End Data Integrity Desing, Jun. 15, 2009, pp. 1-16.*
U.S. Official Action in U.S. Appl. No. 12/692,321 dated Dec. 21, 2011.
U.S. Official Action in U.S. Appl. No. 12/692,321 dated May 10, 2012.
BlueCoat; "*Technology Primer: MAPI Protocol Optimization*"; accessed Nov. 19, 2009 at http://www.google.com/url?sa=t&source=web&ct=res&cd=3&ved=0CA0QFjAC&url=http%3A%2F%2Fwww.bluecoat.com%2Fdoc%2F397&rct=j&q=mapi+chattiness&ei=678ES7W2HoeF4QbSr8G6Cw&usg=AFQjCNFSLHCnh1jLoofwYT2HmprNZ8hOXQ; 2 pgs.
Cisco Systems; "*Cisco Wide Area Application Services Optimizations for Microsoft Exchange*" white paper; 2009 Cisco Systems, Inc.; accessed Nov. 19, 2009 at http://www.cisco.com/en/US/prod/collateral/contnetw/ps5680/ps6870/white_paper_c11-560391-00.pdf; 5 pgs.
Citix; "*Application virtualization and branch office optimization*" white paper; accessed Nov. 19, 2009 at http://www.citrix.com/%2Fsite%2Fresources%2Fdynamic%2Fsalesdocs%2FApp_Virtualization_BranchOff_Opt_WP.pdf; 11 pgs.
Connx Solutions; "*Incremental Updates vs. Full Reload—Change Data Capture*"; Sep. 2007; accessed at http://www.connx.com/ftpdir/white/Change_Data_Capture_White_Paper.pdf; 16 pgs.
MSDN; "*Incremental Change Synchronization (ICS)*"; 2009 Microsoft Corporation; accessed Dec. 18, 2009 at http://msdn.microsoft.com/en-us/library/aa142535.aspx; 3 pgs.
Persistent Systems Private Limited; "*ensure Synchronization Server*"; 2001; accessed at http://www.darnis.fr/images/EnsureDataSheet.pdf; http://www.persistentdata.com; 2 pgs.
Riverbed; "*Performance Brief: Mobile Application Acceleration*"; accessed Nov. 19, 2009 at http://www.netutils.com/documentation/Riverbed/SolutionBriefs/SHM.pdf; 2 pgs.
Trialogue Systems; "*Increase Performance across Any Connection*"; May 31, 2008; accessed Nov. 20, 2009 at http://trialoguesystems.com/optimization/; 3 pgs.
WisdomForce Technologies; "*WisdomForce DatabaseSync*"; 2009; accessed Dec. 3, 2009 at http:www.wisdomforce.om/products-DatabaseSync.html; 1 pg.

* cited by examiner

MASSIVE STRUCTURED DATA TRANSFER OPTIMIZATIONS FOR HIGH-LATENCY, LOW-RELIABILITY NETWORKS

RELATED APPLICATION

Related U.S. patent application Ser. No. 12/692,321, filed on even date herewith entitled "Moving Large Dynamic Datasets Via Incremental Change Synchronization", and assigned to the assignee of the present application, is hereby incorporated by reference.

BACKGROUND

Structured data transfer optimizations provide a process for transferring large amounts of data over an high-latency and/or unreliable network. In some situations, interaction protocols may impose a large amount of overhead data as well as introduce transmission delays due to the need to complete multiple set of operations while waiting for confirmation over the network. For example, the Messaging Application Programming Interface (MAPI) protocol allows a great degree of features and functionality in exchanging messages, but can require a great deal of command and control information and multiple operations to be transmitted along with each data message. This often causes problems when users need to transfer large amounts of message data, such as when a user's message files are being moved to a new server. Further, transmitting this large amount of data through multiple operations may consume local resources inefficiently, such as idling local resources while waiting for confirmation from the remote server.

SUMMARY

Structured data transfer optimizations may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Optimizations for data transmission may be provided. A portion of a data block may be read into a batch by a read thread on a first server. The batch may be passed to a transmission thread. The transmission thread may then transmit the first batch to a second server while the read thread asynchronously reads a second portion of the data block into another batch.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Data transfer optimizations for high latency and/or low reliability networks may be provided. Consistent with embodiments of the present invention, the transfer of a large block of data, such as a user's mailbox file comprising potentially hundreds and/or thousands of messages, may be accomplished via streaming the data from a source server to a destination server. On the source server, the individual pieces of data (e.g., messages) may be read by a threaded process, concatenated, and converted into binary data batches. Each batch may be compressed using an algorithm such as the Lempel-Ziv (LZ), DEFLATE (e.g., gzip), and/or LZ-Reneau (LZR) compression methods. The data may be streamed over a network, such as the Internet, to a receiving thread on the destination server by a transmission thread on the source server while the read thread asynchronously reads and prepares the next batch of data. A write thread on the destination server may asynchronously write the batch of data to disk and verify that the data was correctly received (e.g., via a checksum-based error detection algorithm).

Figure 1:
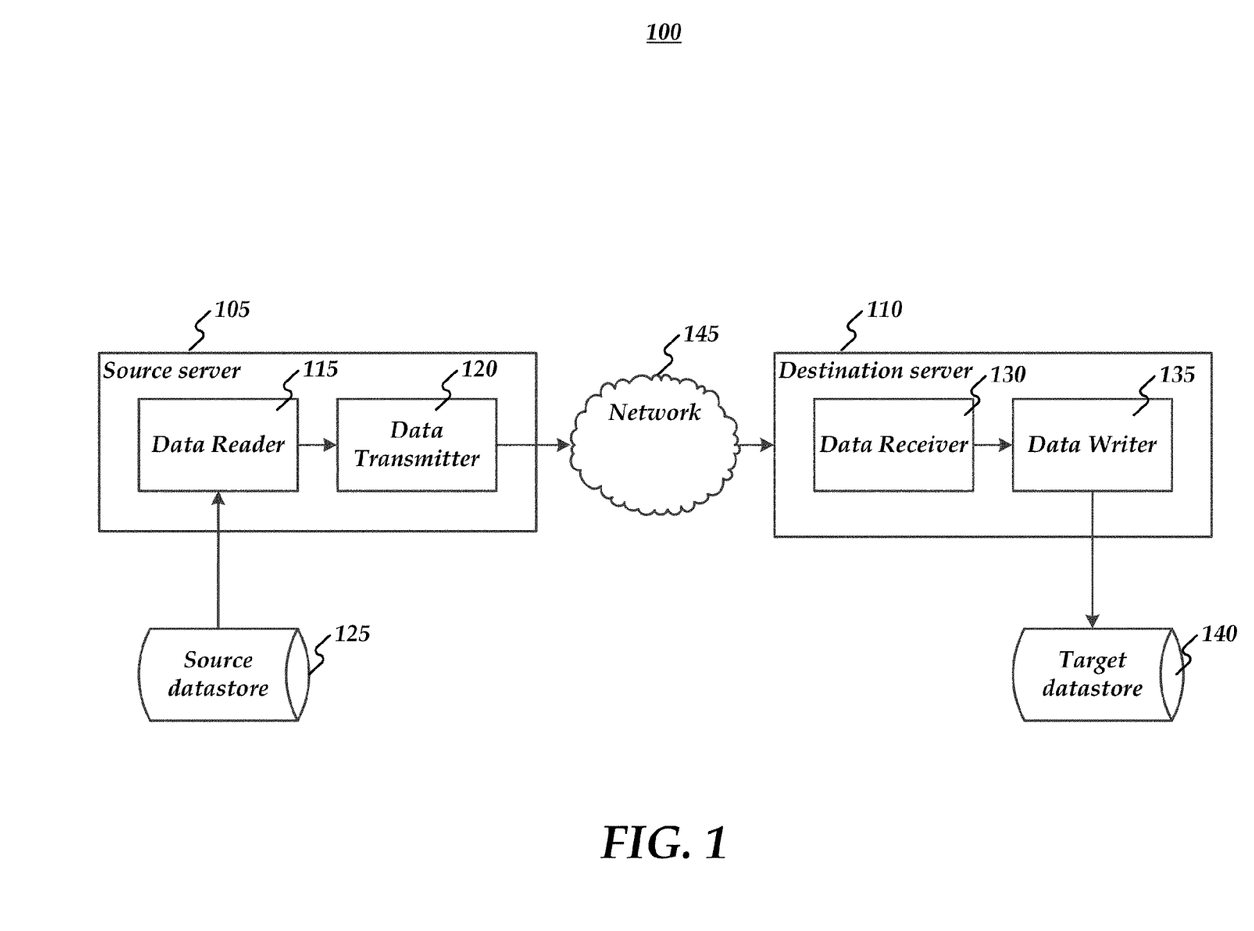
FIG. 1 is a block diagram of an operating environment.

FIG. 1 is a block diagram of an operating environment 100 for providing data transfer optimization. Operating environment 100 may comprise a source server 105 and a destination server 110. Source server 105 may comprise a data reader 115, a data transmitter 120, and a source datastore 125. Data reader 115 and data transmitter 120 may comprise, for example, asynchronous threaded processes. Destination server 110 may comprise a data receiver 130, a data writer 135, and a target datastore 140. Data receiver 130 and data writer 135 may comprise, for example, asynchronous threaded processes. Consistent with embodiments of the invention, source datastore 125 and/or target datastore 140 may be operatively connected to different servers other than source server 105 and/or destination server 110. That is, source server 105 may be operative to transmit data associated with a different physical computing device (not shown) and destination server 110 may be operative to write data to a storage device associated with yet another different physical computing device (not shown).

Figure 2:
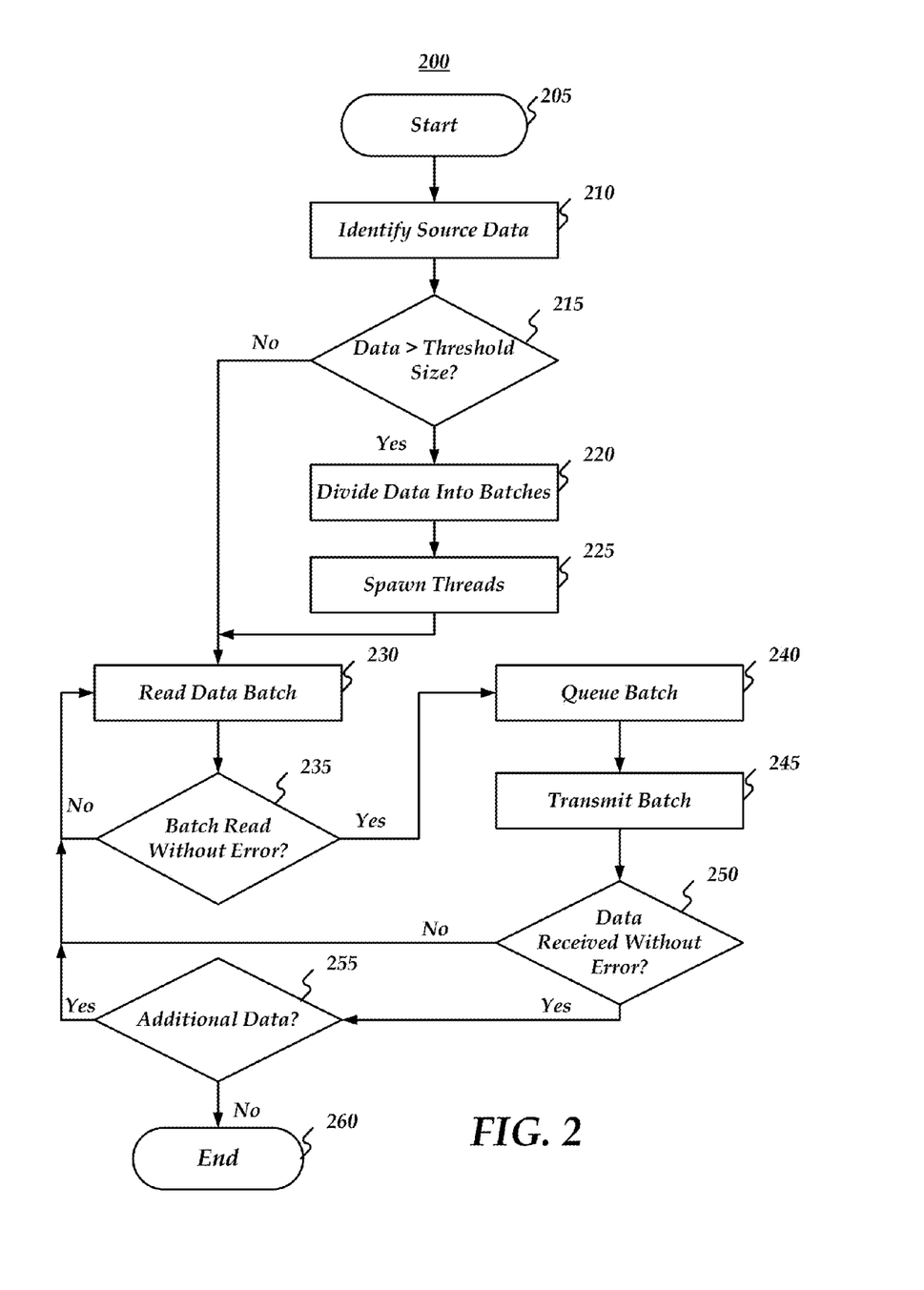
FIG. 2 is a flow chart of a method for providing optimized data transfer.

FIG. 2 is a flow chart setting forth the general stages involved in a method 200 consistent with an embodiment of the invention for providing data transfer optimizations. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may identify a block of source data for transfer. For example, a user's mailbox file, a relational database, or a file hierarchy such as a website may need to be transferred from a source server to a target server. The identification may comprise a manual selection by a user, such as an administrator.

Consistent with embodiments of the invention, method 200 may begin when an automated process detects that source datastore 125 has reached a certain capacity level. That is, source server 105 may initiate the data transfer process when the amount of data on the datastore exceeds a threshold (e.g., 90%) of available storage space. A new server, such as destination server 110 may be set up to provide additional storage, and one or more data blocks from source server 105 may be identified for transfer to the new server. Data blocks may comprise raw data and/or metadata such as folder handles, version or tracking information, author data, etc.

From stage 210, where computing device 300 identified the data block to be transferred, method 200 may advance to stage 215 where computing device 300 may determine whether the data block is greater than a threshold size. For example, a threshold value may determine whether a user's mailbox file is greater than a value such as 5 MB. The threshold value may be computed according to a batch size as described below; the threshold may comprise the batch size itself or the batch size times a multiplier value, such as 100. The data block may be compressed prior to evaluating its size.

If, at stage 215, computing device 300 determines that the data block is greater than the threshold size, method 200 may advance to stage 220 where computing device 300 may divide the data block into batches. For example, source server 105 may convert a data block comprising a plurality of messages of a user's mailbox into a single block of binary data. This block of binary data may be compressed according to a known compression algorithm. The block may then be divided into batches, such as 256 kB size chunks. Once computing device 300 divides the data into batches in stage 220, method 200 may continue to stage 225 where computing device 300 may spawn a plurality of work threads. For example, source server 105 may spawn one or more read threads and one or more transmit threads. Similarly, destination server 110 may spawn one or more receive threads and one or more write threads.

After computing device 300 spawns the work threads in stage 225, or if the data is determined to be less than the threshold size in stage 215, method 200 may proceed to stage 230 where computing device 300 may read the data. For example, data reader 115 may comprise one or more read threads operative to read data out of the identified data block. Consistent with embodiments of the invention, multiple read threads may be operative to associate their respectively read batches with an identifier that may provide ordering information. That is, a batch comprising the start of the data block may be identified as the first batch, even if it is not the first batch to be read, transmitted, received, verified, and/or written.

Once computing device 300 reads the data batch in stage 240, method 200 may advance to stage 235 where computing device 300 may determine whether the batch was read without error. For example, a checksum may be calculated according to the data batch as saved in source datastore 125 and according to the data batch as read into memory by data reader 115. If the checksums are not identical, computing device 300 may determine that an error occurred. Consistent with embodiments of the invention, computing device 300 may be operative to establish a synchronization point that encompasses several batches. For example, every 100 messages of a mailbox file and/or every 10 MB of data may comprise a synchronization point at which time computing device 300 may perform error checking of some and/or all of the data batches encompassed within that subset of the data block.

If an error is determined to have occurred, computing device 300 may return to stage 230 and may re-read the corrupted data batch and/or all of the data batches within the data block encompassed by the synchronization point. Further consistent with embodiments of the invention, computing device 300 may be operative to save data batches in memory until the batches are verified as having been read, transmitted, received, and/or written without error.

Once computing device 300 determines that the data batch has been read without error at stage 235, method 200 may advance to stage 240 where computing device 300 may queue the data batch for transmission. For example, source server 105 may provide the data batch to a transmission thread. If multiple read threads are reading and preparing data batches, each batch may be placed in a buffer to await transmission. Consistent with embodiments of the invention, each batch may be compressed (e.g., using gzip) prior to transmission.

After queuing the data batch at stage 240, method 200 may advance to stage 245 where computing device may transmit the batch. For example, a transmission thread on source server 105 may send the data batch over network 145 to destination server 110 using a known protocol, such as TCP/IP. Data receiver 130 may comprise one or more threads operative to receive the transmitted data batch and read the data into a memory associated with destination server 110.

Once the data batch has been transmitted at stage 245, method 200 may advance to stage 250 where computing device 300 may determine whether the data batch was received without error. For example, source server 105 may provide a checksum associated with the transmitted data batch. Destination server 110 may compute a checksum for the received data batch before and/or after writing it to target datastore 140. This verification of received data may also make use of synchronization points encompassing multiple batches, as described above.

If computing device 300 determines that the data was not received without error, method 200 may return to stage 230 and/or stage 245 where computing device 300 may re-read and/or re-transmit the data batch or batches containing errors. For example, destination server 110 may determine that one batch out of 10 encompassed within a synchronization point experienced an error during transmission. Source server 105 may have retained each batch in memory until verifying that the batch had been received without error, and may simply re-transmit the corrupted data batch. For another example, source server 105 may re-read the corrupted batch and/or all data batches encompassed by the synchronization point, verify that the read occurred without error, and retransmit the batch or batches to destination server 110.

Otherwise, once the data batch has been verified as having been received without error, method 200 may advance to stage 255 where computing device 300 may determine whether additional data remains to be transferred. If so, method 200 may return to stage 230 where reading of the data block may continue. Otherwise, method 200 may end at stage 260.

Consistent with embodiments of the invention, the read operations of data reader 115, the transmission and receiving operations of data transmitter 120 and data receiver 130, and the write operations of data writer 135 may be performed asynchronously. That is, using a multi-threaded architecture, each thread may perform its own task independently of the other threads. For example, a read thread may read and queue three data batches while a transmission thread sends another batch to a receive thread on destination server 110. If the transmission thread is determined to be waiting on the read thread(s) to prepare new data batches for transmission. Source server 300 may be operative to spawn additional read threads in order to prepare additional data batches simultaneously.

Rather than transferring data items individually and incurring the overhead of transmission/receiving operations for each item, multiple data items may be transferred using a single transmit/receive operation per batch. Moving or copying a single message from a folder on one server to another may comprise a plurality of operations on both the source server and the destination server. For example, the source server may perform operations such as identifying a folder for the message, retrieving metadata (e.g., author or version information) associated with the folder, obtaining a filehandle for the folder, opening the filehandle for the folder, retrieving metadata associated with the message, creating a copy of the message and associated metadata in memory, closing the filehandle, and initiating the transmission of the message and metadata from the source server to the destination server. The destination server may need to perform a similar set of operations to write the message to its new location.

Consistent with embodiments of the invention, each batch of data to be transferred from the source server to the destination server may be associated with a single set of operations on the server and a single set of operations on the destination. For example, the data to be moved may comprise all messages in a user's mailbox. This data may be broken into batches associated with subfolders within the user's mailbox in order to reduce the overhead needed to maintain the mailbox structure. A data batch may therefore comprise, as an example, a single folder comprising 60 messages. Rather than the source server having to open a filehandle, read and copy the associated metadata and individual message data, transmit the data and associated metadata to the destination, and close the filehandle for each message, the server may perform the operations on the folder only once. That is, the source server may get the folder name, open a filehandle, and retrieve the folder metadata once and use the same filehandle and metadata for each of the messages in the folder. This batch of data may then be transferred to the destination server, which may make similar efficiency gains by obtaining a destination folder filehandle once and using it to write all of the messages in the batch. The destination server may then close its filehandle and report success to the source server. The source server may wait on this success message to close the source folder filehandle, but may have been asynchronously reading and preparing the next batch of data for transmission while waiting.

An embodiment consistent with the invention may comprise a system for optimizing data transfer. The system may comprise a memory storage and a processing unit coupled to the memory storage. The processing unit may be operative to read a first portion of a data block into a first batch by a read thread, pass the first batch to a transmission thread, transmit the first batch to a destination server by the transmission thread, and asynchronously read a second portion of the data block into a second batch by the read thread. The batch may be received by a receiving thread on a similar system comprising a destination server. A write thread of the destination server may be operative to store the received batch to the server's memory storage. The receiving system may be operative to notify the sending system of whether the batch was received without error. Pending this notification, the sending system may be operative to persist each data batch in a volatile memory in case the batch needs to be retransmitted.

Another embodiment consistent with the invention may comprise a system for providing optimized data transfer. The system may comprise a memory storage and a processing unit coupled to the memory storage. The processing unit may be operative to select a block of data to be copied from the system to a second, similar system, divide the block of data into a plurality of batches, read a first batch of the plurality of batches, provide the first batch to a transmit thread of the first system, transmit the first batch to a receive thread of the second system, and asynchronously read a second batch of the plurality of batches. Each batch may comprise 256 kB of data, and may be compressed prior to transmission.

Yet another embodiment consistent with the invention may comprise a system for providing optimized data transfer. The system may comprise a memory storage and a processing unit coupled to the memory storage. The processing unit may be operative to identify a plurality of source data on a first server, determine whether the plurality of source data is greater than a threshold size, and, if so, spawn at least one read thread and at least one transmit thread on the system. The processing unit may be further operative to divide the plurality of source data into a plurality of batches of substantially similar size, read a first batch of the plurality of batches into the memory storage, determine whether the first batch has been read without error, transmit the first batch by the at least one transmit thread to a second system, and read a second batch of the plurality of batches by the at least one read thread. The processing unit may be further operative to determine whether the first batch has been received without error by the second system and, if so, transmit the second batch by the at least one transmit thread to the second system.

Figure 3:
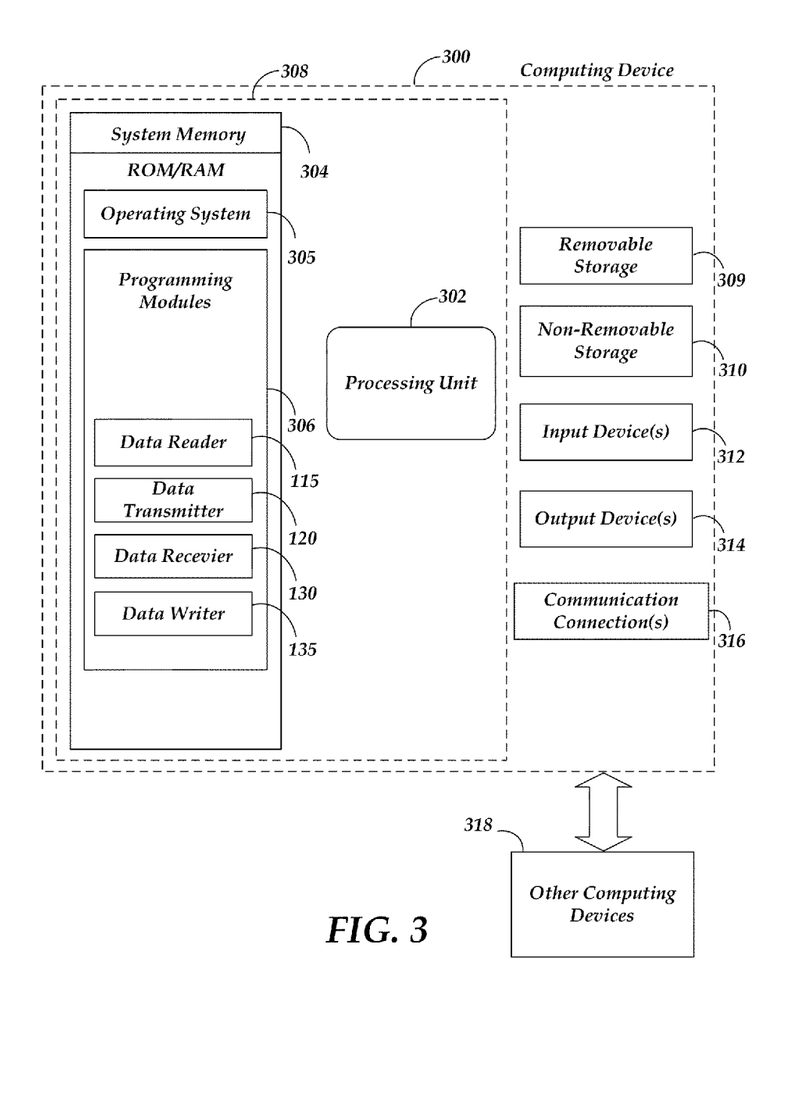
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, such as data reader 115 and/or data transmitter 120. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. data reader 115) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for optimizing data transfer, the method comprising:
    establishing a plurality of synchronization points throughout a block of data that divides the block of data into a plurality of batches, each batch being associated with a synchronization point;
    reading a first batch by a read thread on a first server;
    if the first batch has been read with error, re-reading the first batch associated with a first synchronization point;
    if the first batch has been read without error:
        passing the first batch to a transmission thread on the first server;
        transmitting the first batch to a second server by the transmission thread; and
        reading a second portion of the block of data into a second batch by the read thread, wherein the read thread is operative to read the second portion of the block of data asynchronously from transmission of the first batch by the transmission thread;
        determining whether transmitting the first batch took a shorter amount of time than reading the second batch; and
            in response to determining that transmitting the first batch took a shorter amount of time than reading the second batch, spawning an additional read thread reading a third batch of the plurality of batches asynchronously from the reading of the second batch by the read thread of the first server.

2. The method of claim 1, wherein the block of data comprises at least one of the following: a relational database, a mailbox comprising a plurality of messages, and a plurality of files.

3. The method of claim 1, wherein determining whether the first batch has been read without error comprises:
    calculating a first checksum associated with the first batch as stored in the block of data on the first server;
    calculating a second checksum associated with the first batch as read by the read thread; and determining whether the first checksum is the same as the second checksum.

4. The method of claim 1, further comprising:
    determining whether the first batch has been transmitted without error; and
    in response to determining that the first batch has not been transmitted without error:
        re-reading the first batch by the read thread, and
        re-transmitting the first batch by the transmission thread.

5. The method of claim 1, further comprising:
    receiving the first batch by a receive thread on the second server;
    determining, by the second server, whether the first batch has been received without error;
    in response to determining that the first batch has been received without error, passing the first batch to a write thread on the second server; and
    writing the first batch to a data store associated with the second server by the write thread, wherein the read thread is operative to write the first batch asynchronously from the receipt of the second batch by the receive thread.

6. The method of claim 5, wherein determining whether the first batch has been received without error comprises:
    receiving a first checksum from the first server associated with the first batch;
    calculating a second checksum according to the received first batch; and
    determining whether the first checksum is the same as the second checksum.

7. The method of claim 5, further comprising in response to determining that the first batch has not been received without error, requesting that the first server retransmit the first batch.

8. The method of claim 7, further comprising:
    saving the first batch in a volatile memory associated with the first server;
    receiving the request to retransmit the first batch by the first server; and
    retransmitting the first batch to the second server as saved in the volatile memory associated with the first server.

9. The method of claim 7, further comprising:
    receiving the request to retransmit the first batch by the first server;
    rereading the first batch from the block of data; and
    retransmitting the reread first batch by the first server to the second server.

10. The method of claim 5, further comprising in response to determining that the first batch has been received without error by the second server, notifying the first server that the first batch has been received without error.

11. The method of claim 10, further comprising saving the first batch in a volatile memory associated with the first server; and in response to receiving notification from the second server that the first batch has been received without error, releasing the volatile memory associated with saving the first batch.

12. A computer-readable storage device which stores a set of instructions which when executed performs a method for providing optimized data transfer, the method executed by the set of instructions comprising:
    selecting a block of data to be copied from a first server to a second server;

establishing a plurality of synchronization points throughout the block of data that divides the block of data into a plurality of batches, each being associated with a synchronization point;

reading a first batch of the plurality of batches by a read thread of the first server;

determining whether the first batch has been read with or without error:
 in response to determining that the first batch has been read with error, re-read the first batch associated with a first synchronization point;
 in response to determining that the first batch has been read without error:
  providing the first batch to a transmit thread of the first server;
  transmitting the first batch to a receive thread of the second server;
  reading a second batch of the plurality of batches asynchronously by the read thread of the first server;
  determining whether transmitting the first batch took a shorter amount of time than reading the second batch; and
   in response to determining that transmitting the first batch took a shorter amount of time than reading the second batch, spawning an additional read thread reading a third batch of the plurality of batches asynchronously from the reading of the second batch by the read thread of the first server.

13. The computer-readable storage device of claim 12, wherein each batch comprises 256 kB of data.

14. The computer-readable storage device of claim 12, further comprising compressing each batch prior to transmission.

15. The computer-readable storage device of claim 12, further comprising determining whether at least one of the plurality of batches has been transmitted to the second server without error; and
 in response to determining that at least one of the plurality of batches has not been transmitted to the second server without error, retransmitting the at least one of the plurality of batches to the second server.

16. The computer-readable storage device of claim 12, further comprising:
 reading subsequent batches of the plurality of batches asynchronously by the read thread and the additional read thread; and
 queuing each subsequent batch for transmission by the transmit thread in an order associated with the block of data.

17. A system for providing optimized data transfer, the system comprising:
 a memory storage; and
 a processing unit coupled to the memory storage, wherein the processing unit is operative to:
  identify a plurality of source data on a first server,
  determine whether the plurality of source data is greater than a threshold size,
  in response to determining that the plurality of source data is greater than a threshold size, spawn at least one read thread and at least one transmit thread on the system,
  establishing a plurality of synchronization points throughout the plurality of source data that divides the plurality of source data into a plurality of batches of substantially similar size,
  read a first batch of the plurality of batches into the memory storage, wherein the first batch is associated with a first synchronization point,
  determine whether the first batch has been read with or without error,
  in response to determining that the first batch has been read with error, re-read the first batch associated with the first synchronization point,
  in response to determining that the first batch has been read without error, transmit the first batch by the at least one transmit thread to a second system,
  read a second batch of the plurality of batches by the at least one read thread, wherein the at least one read thread is operative to read the second batch of the plurality of source data asynchronously from transmission of the first batch by the transmit thread,
  determining whether transmitting the first batch took a shorter amount of time than reading the second batch; and
  in response to determining that transmitting the first batch took a shorter amount of time than reading the second batch, spawning an additional read thread reading a third batch of the plurality of batches asynchronously from the reading of the second batch by the at least one read thread of the first server
  determine whether the first batch has been received without error by the second system, and
  in response to determining that the first batch has been received without error by the second system, transmit the second batch by the at least one transmit thread to the second system.

18. The system of claim 17, wherein the at least one read thread and the at least one transmit thread each perform asynchronously to the other.

19. The system of claim 18, wherein to determine whether the first batch has been read without error, the processing unit is operative to:
 calculate a first checksum associated with the first batch as stored in the plurality of source data on the first server;
 calculate a second checksum associated with the first batch as read by the at least one read thread; and
 determine whether the first checksum is the same as the second checksum.

20. The system of claim 17, wherein the processing unit is further operative to:
 compress each batch prior to transmission.

* * * * *